United States Patent
Liu et al.

(10) Patent No.: US 10,594,525 B2
(45) Date of Patent: Mar. 17, 2020

(54) DUAL-USE OF DOPPLER MODE INDICATION IN HIGH EFFICIENCY WIRELESS LAN

(71) Applicant: MEDIATEK INC., Hsin-Chu (TW)

(72) Inventors: Jianhan Liu, San Jose, CA (US); Tianyu Wu, Fremont, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/928,479

(22) Filed: Mar. 22, 2018

(65) Prior Publication Data

US 2018/0309605 A1    Oct. 25, 2018

Related U.S. Application Data (60) Provisional application No. 62/488,085, filed on Apr. 21, 2017.

(51) Int. Cl.
| H04L 27/26 | (2006.01) |
| H04L 25/02 | (2006.01) |
| H04W 84/12 | (2009.01) |

(52) U.S. Cl.
CPC ...... *H04L 27/2602* (2013.01); *H04L 25/0222* (2013.01); *H04L 25/0224* (2013.01); *H04W 84/12* (2013.01)

(58) Field of Classification Search
CPC .............. H04L 25/0222; H04L 25/0224; H04L 27/2602; H04W 84/12
See application file for complete search history.

(56) References Cited

U.S. PATENT DOCUMENTS

| 2007/0217326 A1* | 9/2007 | Rajagopal ........... H04L 27/0012 370/204 |
| 2009/0040998 A1 | 2/2009 | Park |
| 2013/0121244 A1* | 5/2013 | Vermani ............... H04L 1/0029 370/328 |
| 2016/0248542 A1 | 8/2016 | Liu et al. |
| 2018/0006687 A1* | 1/2018 | Porat ........................ H04L 1/00 |

FOREIGN PATENT DOCUMENTS

| WO | 2016049216 A2 | 3/2016 |
| WO | 2016154350 A1 | 9/2016 |

* cited by examiner

*Primary Examiner* — Kevin C. Harper
*Assistant Examiner* — Derrick V Rose (57) ABSTRACT

Systems and methods of expanding indication capabilities of existent PPDU preamble fields. An existing field "Doppler mode" in a preamble is redefined into a dual-use field for indicating channel variation for a short packet as well as for indicating presence of mid-amble(s) in a long packet. Particularly, for a long packet (longer than a predefined data transmission time or a longer than a predefined number of data symbols), the two possible values of the one-bit "Doppler mode" field indicate whether there is any mid-amble carrying training symbols in the payload. On the other hand, for a short packet, the two possible values in the same field indicate whether the channel for transmitting the instant packet is currently time-variant as determined by the transmitting device.

18 Claims, 5 Drawing Sheets

DUAL-USE OF DOPPLER MODE INDICATION IN HIGH EFFICIENCY WIRELESS LAN

CROSS-REFERENCE TO RELATED APPLICATION

This patent application claims priority and benefit of U.S. Provisional Patent Application No. 62/488,085, entitled "DUAL-USE OF DOPPLER MODE IN HIGH EFFICIENCY WIRELESS LAN," filed on Apr. 21, 2017. This patent application is related to the commonly-owned, co-pending U.S. patent application Ser. No. 15/342,299, entitled "SIGNALING AND FEEDBACK SCHEMES OF TIME-VARYING CHANNELS IN HIGH-EFFICIENCY WLAN," filed on Nov. 3, 2016. The entire contents of the foregoing applications are herein incorporated by reference for all purposes.

TECHNICAL FIELD

Embodiments of the present disclosure relate generally to the field of network communication, and more specifically, to the field of communication protocols in Wi-Fi network communication.

BACKGROUND OF THE INVENTION

Recent developments have enabled wireless local area networks (WLANs) to be deployed for outdoor uses. However, in outdoor scenarios, wireless channels in a WLAN are often affected by the Doppler effect, for example caused by movements of associated wireless stations (STA) or fast-moving objects around the STAs. As a result, the wireless channels may vary with time during transmission of a packet. If such channel variation is not taken into account in transmitting or receiving the packet, transmission performance in the WLAN system tends to be adversely affected.

An existing approach to solve the temporal channel variation issue involves inserting a "mid-amble" in the data field of a packet, the mid-amble including training symbols used by a receiving device to perform channel estimation and thereby keep track of the channel condition in real time. The mid-amble may be a repeat of a high efficiency-short training field (HE-STF) or a high efficiency-long training field (HE-LTF) included in the preamble. Typically, a mid-amble is inserted following a predefined data length, e.g., after each predefined transmission time or each predefined number of orthogonal frequency-division multiplexing (OFDM) symbols. Thus, a mid-amble is only applicable if the packet data exceeds the predefined length.

Depending on the implementation of the transmitting device, inserting a mid-amble is optional even for packets having a data length that is greater than the predefined length. So it is necessary to inform the receiving device of the presence of mid-ambles. To this end, the packet preamble uses a dedicated field as an indicator. For example, as in the IEEE 802.11 family of Standard and Specifications, a one-bit "Doppler mode" field in the preamble HE-SIG A field is defined to indicate whether any Doppler mode mid-amble is included in the packet. However, as a mid-amble is only eligible if the packet exceeds a certain length, the "Doppler mode" field cannot provide any meaningful indication for shorter packets and therefore constitutes a waste of an indication resource in the preamble. Thus, for these shorter packets, there lacks a mechanism for a receiving device to acquire knowledge of the current channel condition from a received packet. Unfortunately, constrained by the existent physical layer conformance procedure (PLCP) protocol data unit (PPDU) structures with all the preamble bits already used or reserved for specific indications, it is difficult to introduce any additional field for reporting the channel condition in a shorter packet.

SUMMARY OF THE INVENTION

Accordingly, disclosed herein are embodiments directed to a mechanism of indicating channel variation in a short packet without requiring a dedicated indication field in the physical layer conformance procedure (PLCP) protocol data unit (PPDU) (or herein "packet") preamble.

Embodiments of the present disclosure redefine an existing field in a preamble into a dual-use field for indicating channel variation for a short packet as well as for indicating presence of mid-amble(s) in a long packet. Particularly, for a long packet (longer than a predefined data transmission time or a longer than a predefined number of data symbols), the two possible values of the one-bit "Doppler mode" field indicate whether there is any mid-amble carrying training symbols in the payload. On the other hand, for a short packet, the two possible values in the same field indicate whether the channel for transmitting the instant packet is currently time-variant as determined by the transmitting device.

Thus, the indication provided by the "Doppler mode" field is dependent on the packet length. Correspondingly, the receiving device interprets the indication by the "Doppler mode" field based on the packet length. For a short packet, the transmitting device may determine if the channel is time-variant by calculating a Doppler metric and accordingly set the value of the "Doppler mode" field. An indication that the channel is time-variant can assist the receiving device to make suitable decisions during the course of generating and transmitting packets. For example, for a time-variant channel, the receiving device may decide to use mid-ambles or fixed position pilots in generating and transmitting the next packet, to exclude the wireless channel from serving next multi-user (MU) transmission, to refrain from using beamforming to the stations associated with this wireless channel, and/or to perform link adaptation.

Therefore, according to embodiments of the present disclosure, the "Doppler mode" field is redefined to serve as a dual-use field for indicating two sets of information, for long packets and shorts packets respectively. This advantageously expands the scope of information that can be provided to a receiving device by using the current preamble structure and yet without introducing a new dedicated field. Further, the field can provide an important indication of channel variation to a receiving device even in a short packet and thereby facilitate efficient reverse link transmission from the receiving device through the channel. The receiving device can adapt following packet transmissions to channel variation, thereby enhancing overall WLAN performance, especially when used in outdoor environments.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Dual-Use of Doppler Mode Indication in High Efficiency Wireless LAN

Embodiments of the present disclosure are described in detail with reference to the Physical Layer Convergence Protocol (PLCP) protocol data unit (PPDU) structure as defined in the IEEE 802.11 family of Specifications and Standards. However, the present disclosure is not limited to any specific packet formats or structures, nor limited to any specific industry standards or specifications.

Embodiments of the present disclosure provide a mechanism of expanding the indication capabilities of the existent PPDU preamble fields by redefining a field into a dual-use field capable of indicating two sets of information depending on the data length in a packet. The two sets of information are both related to channel condition characterization. For a long packet, the dual-use field in the preamble is used to indicate whether the data field of the packet contains any mid-amble which carries training symbols. Thus, besides performing channel estimation by using the training symbols in the preamble, a receiving device can repeat a channel estimation process by using the training symbols in the mid-amble. In this manner, the receiving device can track the channel condition in real time and resolve the data fields accordingly. On the other hand, for a short packet, the same field is used to indicate whether the channel transmitting the instant packet is time-variant as determined by the transmitting device. Accordingly, a receiving device can take measures to adapt scheduling and transmission of a next packet to the time-variant channel. As a result, the indication provided by the dual-use field can advantageously contribute to enhance reverse link transmission performance.

Figure 1:
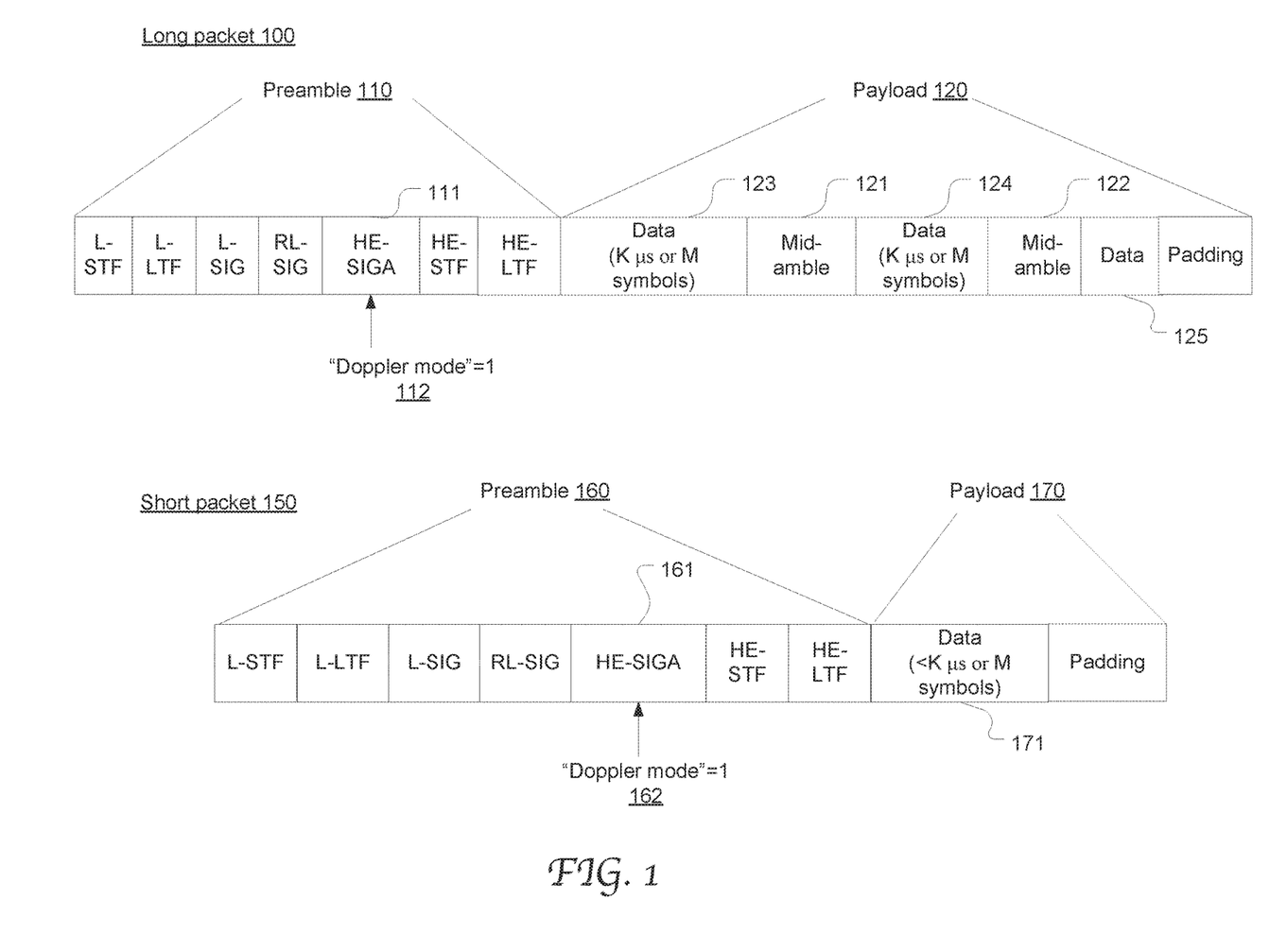
FIG. 1 illustrates the formats of exemplary high efficiency (HE) PPDUs including a dual-use field in the preamble used to indicate two sets of information for long packets and shorts packets respectively in accordance with an embodiment of the present disclosure.

FIG. 1 illustrates the formats of exemplary high efficiency (HE) PPDUs including a dual-use field in the preamble used to indicate two sets of information for long packets and shorts packets respectively in accordance with an embodiment of the present disclosure. A long packet refers a packet having more data than a predefined length, e.g., K µs or M symbols, where K and M are integers; whereas a short packet refers to one having a data length shorter than the predefined value.

In a long packet, a Doppler mode mid-amble can be inserted into the packet following every predefined data length. As illustrated, the long packet 100 carries 3 fields of data 123, 124 and 125 separated by mid-ambles 121 and 122. The data fields 123 and 124 have K µs or M symbols and the field 125 has less data. The preamble 110 includes the short and long training fields ("L-STF," "L-LTF," "HE-STF," and "HE-LTF") and the signaling fields ("L-SIG," "RL-SIG" and "HE-SIG A"). The mid-ambles 121 and 122 carry training symbols to be used by a receiving device to perform channel estimation and thereby keep track of the channel condition in real time. Each mid-amble may be a repeat of the "HE-LTF" and "HE-STF" fields in the preamble.

The HE-SIG A field 113 includes a one-bit subfield (or "field") "Doppler mode" 112 for indicating whether any Doppler mode mid-amble is contained in the payload. In this example, the "Doppler mode" field is set to "1" to indicate that at least one Doppler mode mid-amble is applied in the payload 120. Depending on the implementation of the transmitting device, a mid-amble may not be used even for a long packet, in which case the "Doppler mode" field is set to "0." It is noted that setting the "Doppler mode" to "1" in a long packet does not necessarily indicate that the transmitting device has detected that the channel used for transmitting the instant packet is currently time-varying.

According to embodiments of the present disclosure, the "Doppler mode" field in a short packet is used to indicate whether that the transmitting device has determined that the channel is time-varying. As illustrated, the data field 171 enclosed in the short packet 150 is less than the predefined length and so mid-amble is not applicable in the payload 170. If the transmitter determines that the channel is time-varying, the "Doppler mode" field 162 is set to 1; or else it is set to 0.

Figure 2:
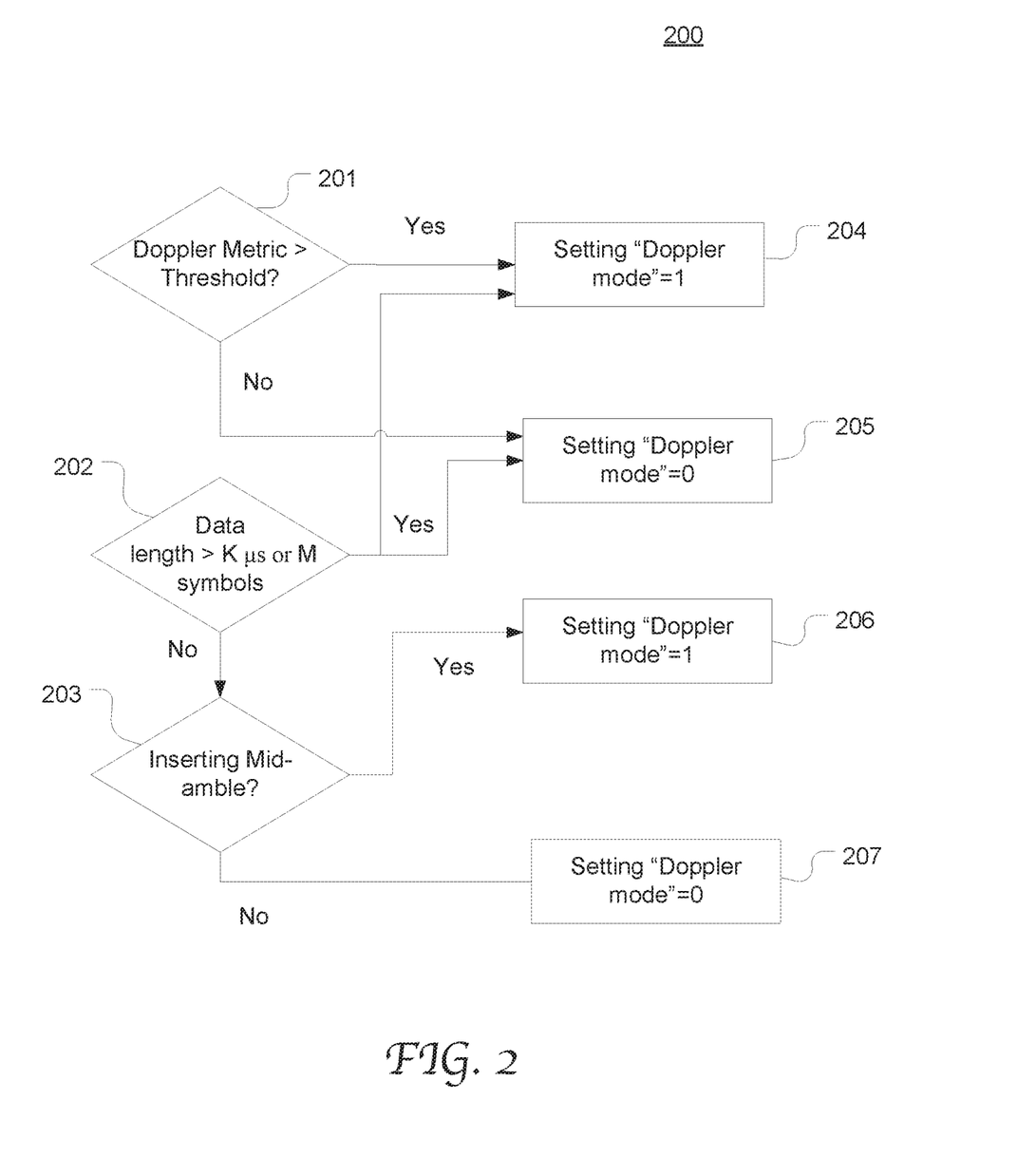
FIG. 2 is a flow chart depicting an exemplary computer controlled process of determining the values of the dual-use "Doppler mode" field based on four different scenarios in accordance with an embodiment of the present disclosure.

Therefore, it is appreciated that the the "Doppler mode" field in a PPDU is redefined to serve as a dual-use field for indicating two sets of information, for long packets and shorts packets respectively. This advantageously expands the scope of information that can be provided to a receiving device by using the current preamble structure and without requiring introducing a new dedicated field. Further, the field can provide an important indication of channel variation to a receiving device and thereby facilitate efficient reverse link transmission from the receiving device. The receiving device can adapt following packet transmissions to channel variation (as described in greater detail below), thereby enhancing overall WLAN performance, especially when used in outdoor environments, FIG. 2 is a flow chart depicting an exemplary computer controlled process 200 of determining the values of the dual-use "Doppler mode" field based on four different scenarios with an embodiment of the present disclosure. Process 200 may be performed by a transmitting device during a packet generation and transmission. At 201, the transmitting device determines whether a Doppler metric of the wireless channel is greater than a Doppler threshold (the first threshold). If so, it means that the wireless channel to be used for transmitting the instant packet is varying with time; otherwise, the channel can be regarded as steady-state or static. At 202, the transmitting device also determines whether the data length in the packet is greater than the threshold length (the second threshold), e.g., K µs or M symbols.

If the Doppler metric is greater than the first threshold as determined in 201 and the data length is shorter than the second threshold as determined in 202, the "Doppler mode" is set to "1" (in 204) which indicates that the channel is time-variant. If the Doppler metric is smaller than the first threshold as determined in 201 and the data length is shorter than the second threshold as determined in 202, the "Doppler mode" is set to "0" (in 205) which indicates that the channel is time-invariant. Of course, the logic values could also be switched.

If the data length is greater than the second threshold as determined at 202, it is further determined whether to insert Doppler mode mid-ambles (in 203). If yes, the "Doppler mode" is set to "1" (in 206) to indicate presence of mid-amble(s) in the payload; otherwise, the "Doppler mode" is set to "0" (in 207) to indicate absence of mid-amble in the payload. Of course, the logic values could be switched.

The present disclosure is not limited to any specific Doppler metric that can be used to indicate a channel variation status. The metric may integrates one or more channel characterization parameters. For example, the Doppler metric can result from channel estimation performed on the OFDM symbols and fixed positioned pilots in a packet that was previously received by the transmitting device. In some embodiments, the Doppler metric is defined as a normalized difference of channel estimations between a number of OFDM symbols. In some other embodiments, the Doppler metric is defined as the energy difference of the constant modulus modulated subcarriers, such as binary shifting key (BPSK) modulated fixed positioned pilots. Various exemplary Doppler metric definitions and processes of determining the metrics are described in greater detail in the commonly-owned, co-pending U.S. patent application Ser. No. 15/342,299, entitled "SIGNALING AND FEEDBACK SCHEMES OF TIME-VARYING CHANNELS IN HIGH-EFFICIENCY WLAN."

Figure 3:
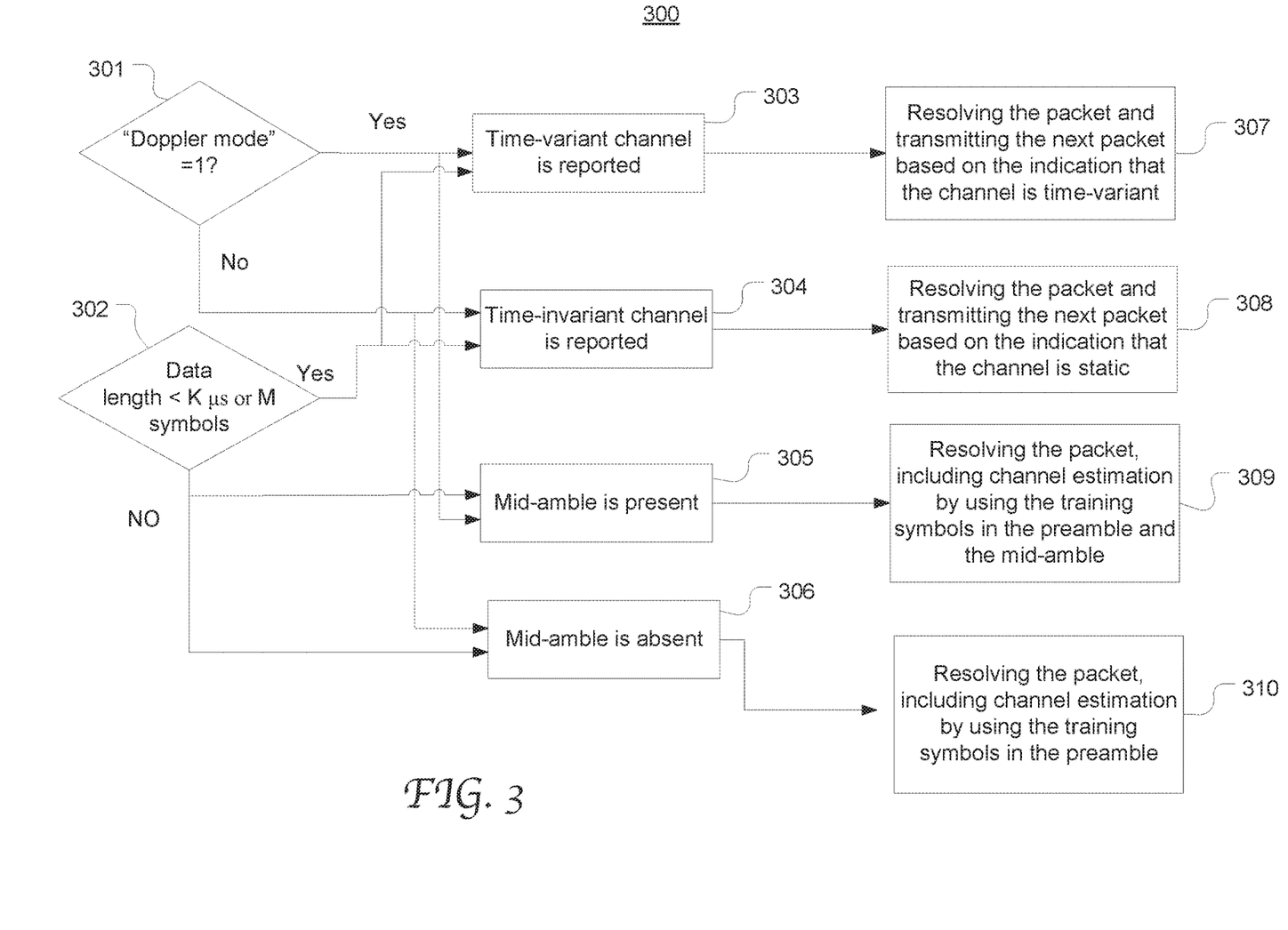
FIG. 3 is a flow chart depicting an exemplary computer controlled process of determining the values of the dual-use "Doppler mode" field based on four different scenarios in accordance with an embodiment of the present disclosure.

FIG. 3 is a flow chart depicting an exemplary computer controlled process 300 of setting the dual-use "Doppler mode" field based on four different scenarios with an embodiment of the present disclosure. Process 300 may be performed by a receiving device that receives a packet generated according to process 200 for example. The receiving device examines the preamble of the received packet to determine the value in the "Doppler mode" (in 301) and the data length in the payload.

If the "Doppler mode" is "1" and the data length is shorter than the predefined threshold, the receiving device automatically interprets the "Doppler mode" indication as a report of a time-variant channel status from the transmitting device (in 303). The receiving device can further resolve the packet, and generates and transmits a subsequent packet based on the channel variation status (in 307). In some embodiment, as the receiving device recognizes that the instant channel is time-variant, it may decide to embed mid-ambles or fixed position pilots in generating and transmitting the subsequent packet. In some embodiments, the receiving device may decide to exclude the time-variant channel from serving a next multi-user multiple input multiple output (MU-MIMO) transmission. Thus the time-variant channel status indication can advantageously facilitate MU-MIMO grouping and enhance MU-MIMO performance.

In some embodiments, as transmission to a STA through a time-variant channel should not be beam-formed, the receiving device may decide to refrain from using beam-forming for transmission to the STA through the channel. In still some embodiments, responsive to the indication that the channel is time-variant, the receiving device may perform link adaption for subsequent transmission via the channel. Particularly, the receiving device may select a Modulation and Coding Scheme (MCS) suitable for time-variant channels, which is typically different from an MCS suitable for static channels. The receiving device may also adapt packet fragmentation based on the time-variant channel status for transmission of a next packet.

Generally, Doppler mode mid-ambles are preferably not applied to a packet if the channel is static or time-invariant for the sake of operation simplicity and power conservation. If the "Doppler mode" is "0" and the data length is shorter than the predefined threshold, the receiving device automatically interprets the "Doppler mode" indication as a report of a time-invariant channel status from the transmitting device (in 304). Accordingly, the receiving device can decide not to use any mid-amble or fixed position pilots in generating and transmitting the subsequent packet regardless of its data length (in 308).

If the receiving device determines that the data length is greater than the threshold in 302, the "Doppler mode" field is interpreted as an indication whether there is Doppler mode mid-amble in the payload. More specifically, if the "Doppler mode" field is "1," the receiving device interprets it as an indication that mid-amble is inserted in the payload (in 305). Accordingly, the packet is resolved, including performing channel estimation on the training symbols in the mid-ambles in addition to channel estimation on the training symbols in the preamble (in 309). If the "Doppler mode" field is "0," the receiving device automatically interprets it as an indication that mid-amble is absent (in 306). Accordingly, channel estimation is only performed on the training symbols in the preamble (in 310) and the data field is resolved without regard to mid-ambles.

Processes 200 and 300 can be implemented as software logic, hardware logic, firmware logic, or a combination thereof.

Figure 4:
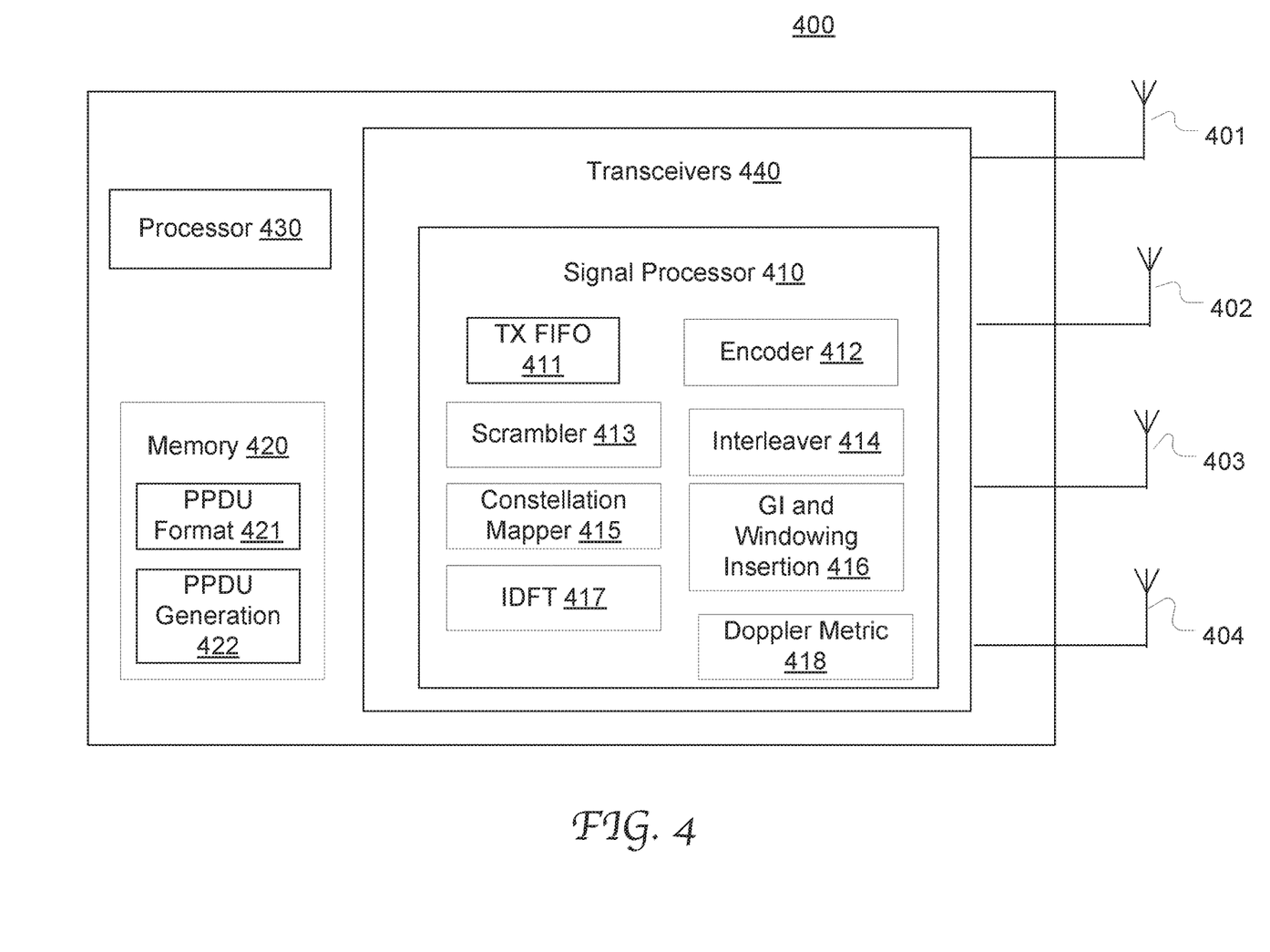
FIG. 4 is a block diagram illustrating the configuration of an exemplary wireless communication device operable to generate a PPDU with a dual-use "Doppler mode" field in accordance with an embodiment of the present disclosure.

FIG. 4 is a block diagram illustrating the configuration of an exemplary wireless communication device 400 operable to generate a PPDU with a dual-use "Doppler mode" field according to an embodiment of the present disclosure. The device 400 may be an AP STA or a non-AP STA and can transmit PPDUs to another device through a WLAN. The device 400 is configured to generate a PPDU and assign a value to the "Doppler mode" field based on the packet length as described in greater detail with reference to the process of FIG. 2.

The device 400 may be a general-purpose computer or any other type of computing device or network device, including a main processor 430, a memory 420 and a transceiver 440 coupled to an array of antenna 401-404. The transceiver 440 includes a signal processor 410 having various modules of the transmit path which is configured to generate each section of a PPDU or any other type of communication transmission unit. For instance, the signal processor 410 includes a transmit First-In-First-Out (TX FIFO) 411, an encoder 412, a scrambler 413, an interleaver 414, a constellation mapper 415, an inversed discrete Fourier transformer (IDFT) 417, and a guard interval (GI) and windowing insertion module 416. The signal processor 410 also includes a Doppler metric module 418 configured to calculate a Doppler metric and compare it with a threshold value to determine whether the instant channel is time-variant.

The memory 430 stores the PPDU format 421 including the redefined dual-use "Doppler mode" field. The PPDU generation module 422 stores processor-executable instructions for generating data as well as configurations of other parts of PPDUs according to the PPDU format 421. The PPDU generation module 422 may decide whether the channel for transmitting a short packet is time-variant and whether to insert a mid-amble in a long packet. The signal processor 410 generates the preamble and the mid-amble accordingly, as described in greater detail with reference to FIGS. 1 and 2.

Figure 5:
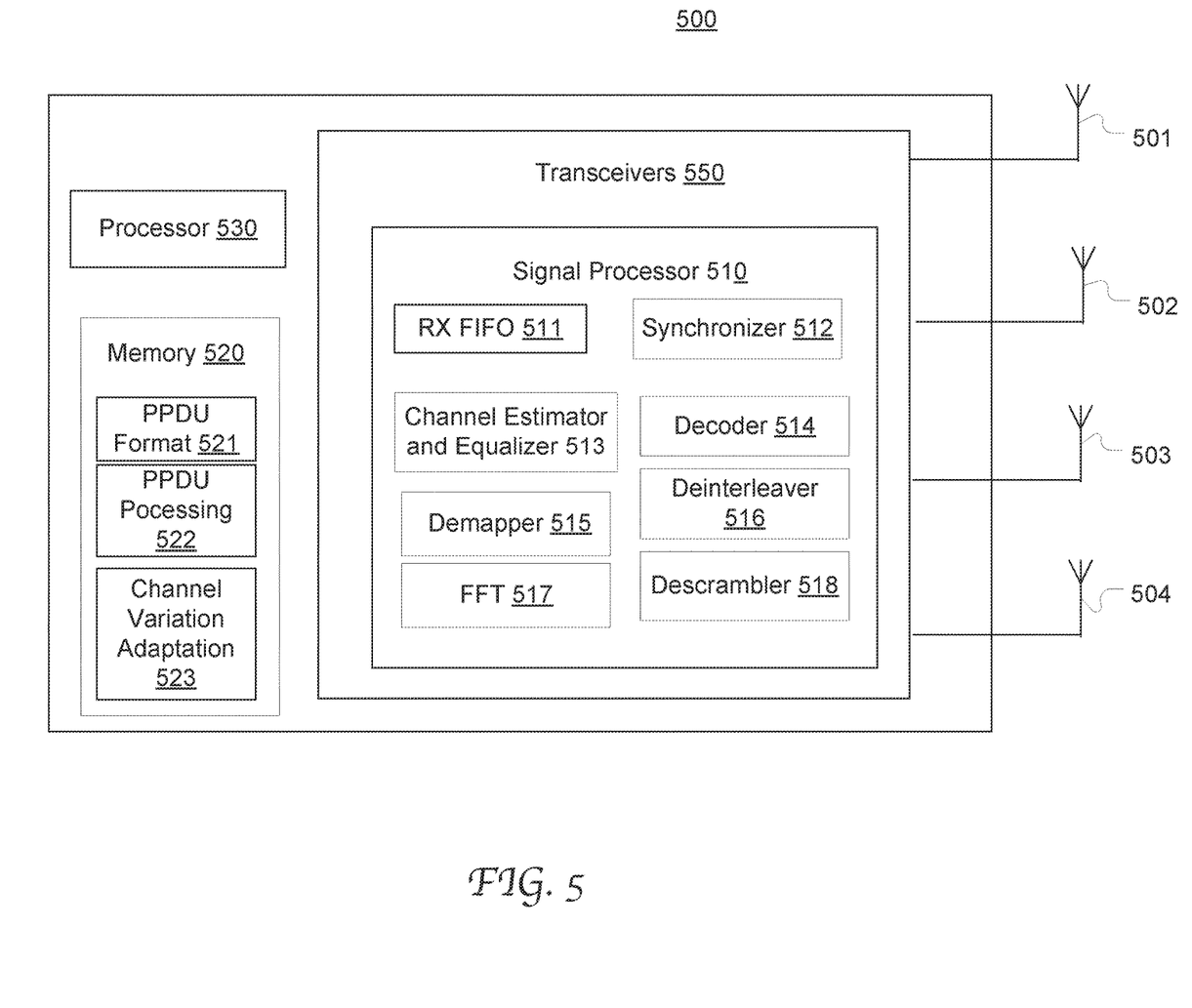
FIG. 5 is a block diagram illustrating the configuration of an exemplary wireless communication device operable to resolve a received PPDU with a dual-use "Doppler mode" field according to an embodiment of the present disclosure.

FIG. 5 is a block diagram illustrating the configuration of an exemplary wireless communication device 500 operable to resolve a received PPDU with a dual-use "Doppler mode" field according to an embodiment of the present disclosure. The device 500 may be an AP STA or a non-AP STA and can receive PPDUs from another device through a WLAN. The device 500 is configured to resolve a received PPDU and determine the time-wise channel condition based on the packet length.

The device 500 may be a general-purpose computer or any other type of computing device or network device, including a main processor 530, a memory 520 and a transceiver 540 coupled to an array of antenna 501-504. The transceiver 540 includes a signal processor 510 having various modules of the receive path which is configured to process a PPDU or any other type of communication transmission units. For instance, the signal processor 510 includes a receive First-In-First-Out (RX FIFO) 511, a synchronizer 512, a channel estimator and equalizer 513, a decoder 514, a demapper 515, a deinterleaver 516, a fast Fourier transformer (FFT) 517 and a descrambler 518.

The memory 530 stores PPDU format 521 including the formats used for redefining the "Doppler mode" field. The PPDU processing module 522 stores processor-executable instructions for resolving various sections of the PPDU, including the preamble according to the PPDU format 521.

Once the signal processor 510 detects the data length and the value in the "Doppler mode" field in the packet, the signal processor 510 processes the preamble and the mid-amble field accordingly. Further, responsive to an indication of channel variation status (short packet with "Doppler mode"=1) and based on the instructions from channel variation adaptation module 523, the signal processor 510 can perform one or more adaption procedure in generating and transmitting a next packet, as described in detail with reference to FIGS. 1 and 3.

It will be appreciated that each of the signal processors in FIG. 4 and FIG. 5 may include a wide range of other suitable components that are well known in the art. The various components can be implemented in any suitable manner that is well known in the art and can be implemented using hardware logic, firmware logic, software logic or a combination thereof. Further, in some embodiments, the transceiver 410 in FIG. 4 may as well include the components in a receive path as described in greater detail with reference to the transceiver 510 in FIG. 5, and vice versa.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising:
generating a packet comprising a preamble and a payload, wherein said generating comprises:
determining a data length of said payload;
responsive to a determination that said data length is greater than a first limit, setting a first field in said preamble to a first value to indicate presence of a Doppler mode mid-amble in said packet and inserting said Doppler mode mid-amble in said payload, wherein said Doppler mode mid-amble comprises a training symbol for channel estimation of a wireless channel by a device that receives said packet; and
responsive to a determination that said data length is smaller than said first limit, setting said first field in said preamble to indicate whether said wireless channel is time-variant; and
transmitting said packet using said wireless channel.

2. The method of claim 1 wherein said generating said packet further comprises determining a channel variation metric, and wherein further setting said first field to indicate whether said wireless channel is time-variant comprises, responsive to a determination that said channel variation metric is greater than a second limit, setting said first field to said first value to indicate that said wireless channel is time-variant.

3. The method of claim 2 further comprising, responsive to a determination that said data length is smaller than said first limit and that said channel variation metric is smaller than said second limit, setting said first field in said preamble to a second value indicating that said wireless channel is time-invariant.

4. The method of claim 3, further comprising, based on a determination that said data length is greater than said first limit, setting said first field to said second value indicating absence of any Doppler mode mid-amble in said packet.

5. The method of claim 2, wherein said channel variation metric is determined based on a difference of channel estimation between Orthogonal Frequency Division Multiplexing (OFDM) symbols that have been transmitted through said wireless channel.

6. A method of wireless communication, said method comprising:
   receiving a first packet transmitted from a wireless channel; and
   resolving said first packet, wherein said resolving comprises:
      based on a determination that a data length of said first packet is shorter than a first limit, using a value of a first field in a preamble of said first packet as an indication of whether said wireless channel is time-variant; and
      based on a determination that said data length of said first packet is greater than said first limit, using a value of said first field as an indication of whether a Doppler mode mid-amble is present in a payload of said first packet,
      wherein based on said determination that said data length of said first packet is shorter than said first limit and based on a detection that said first field has a first value, automatically determining that said wireless channel is time-variant and that said first packet comprises no Doppler mode mid-amble in said payload.

7. The method of claim 6 wherein said resolving further comprises, based on a detection that said first field has said first value and based on said determination that said data length is greater than said first limit: automatically determining that said first packet comprises a Doppler mode mid-amble in said payload; and resolving said Doppler mode mid-amble in a channel estimation process.

8. The method of claim 7, wherein said resolving further comprises based on a detection that said first field in said first packet has a second value and based on said determination that said data length is shorter than said first limit, automatically determining that said wireless channel is time-invariant.

9. The method of claim 7, wherein said resolving further comprises based on a detection that said first field in said first packet has a second value and based on said determination that said data length is longer than said first limit, automatically determining that said wireless channel comprises no Doppler mode mid-amble.

10. The method of claim 6 further comprising, based on a determination that said wireless channel is time-variant, generating a second packet comprising a Doppler mode mid-amble.

11. The method of claim 8 further comprising, based on a determination that said wireless channel is time-invariant, excluding said wireless channel from a multi-user (MU) group for MU-Multiple Input and Multiple Output (MU-MIMO) transmission.

12. The method of claim 6 further comprising, based said indication of whether said wireless channel is time-variant, determining whether to beamform a wireless station that uses said wireless channel.

13. The method of claim 6 further comprising, based on a determination that said wireless channel is time-variant, generating a second packet with link adaptation and transmitting said second packet through said wireless channel.

14. A device comprising:
   a memory;
   a processor coupled to said memory; and
   a transceiver comprising a signal processor and configured to:
      receive a first packet transmitted from a wireless channel;
      based on a determination that a data length of said first packet is shorter than a first limit, use a value of a first field in a preamble of said first packet as an indication of whether said wireless channel is time-variant; and
      based on a determination that said data length of said first packet is greater than said first limit, use a value of said first field as an indication of whether a Doppler mode mid-amble is present in a payload of said first packet,
      wherein based on said determination that said data length is shorter than said first limit and based on a detection that said first field has a first value, automatically determine that said wireless channel is time-variant and that said first packet comprises no Doppler mode mid-amble in said payload.

15. The device of claim 14, wherein said transceiver is further configured to, based on a detection that said first field has said first value and based on said determination that said data length is greater than said first limit, automatically determine that said first packet comprises a Doppler mode mid-amble in said payload and resolving said Doppler mode mid-amble in a channel estimation process.

16. The device of claim 15, wherein the transceiver is further configured to, based on a detection that said first field in said first packet has a second value and based on said determination that said data length is shorter than said first limit, automatically determine that said wireless channel is time-invariant.

17. The device of claim 14, wherein the transceiver is further configured to, based on a detection that said first field in said first packet has a second value and based on said determination that said data length is longer than said first limit, automatically determine that said wireless channel comprises no Doppler mode mid-amble.

18. The device of claim 14, wherein the transceiver is further configured to, based on said determination that said wireless channel is time-variant, perform one or more of: generating a second packet comprising a Doppler mode mid-amble; excluding a wireless station that uses said wireless channel from a multi-user (MU) group for MU-Multiple Input and Multiple Output (MU-MIMO) communication; refraining from beamforming a wireless station that uses said wireless channel; and generating a second packet with link adaptation and transmitting said second packet through said wireless channel.

\* \* \* \* \*